United States Patent
Weng et al.

(10) Patent No.: US 8,045,325 B2
(45) Date of Patent: Oct. 25, 2011

(54) DISK ARRAY STRUCTURE

(75) Inventors: Mao-Huai Weng, San-Chung (TW); Fang-Kao Hsiao, San-Chung (TW); Chun-Hao Pan, San-Chung (TW); Hsuan-Hung Tai, San-Chung (TW)

(73) Assignee: Acard Technology Corp., San-Chung (TW)

( * ) Notice: Subject to any disclaimer, the term of this patent is extended or adjusted under 35 U.S.C. 154(b) by 0 days.

(21) Appl. No.: 12/003,780

(22) Filed: Dec. 31, 2007

(65) Prior Publication Data

US 2011/0228468 A1 Sep. 22, 2011

(51) Int. Cl.
*G06F 1/16* (2006.01)
(52) U.S. Cl. ................................................ 361/679.33
(58) Field of Classification Search . 361/679.33–679.39
See application file for complete search history.

(56) References Cited

U.S. PATENT DOCUMENTS

| | | | | |
|---|---|---|---|---|
| 5,777,845 A * | 7/1998 | Krum et al. | | 361/679.34 |
| 6,351,374 B1 * | 2/2002 | Sherry | | 361/679.33 |
| 6,891,721 B2 * | 5/2005 | Huang | | 361/679.33 |
| 7,120,014 B2 * | 10/2006 | Yang | | 361/679.32 |
| 7,269,003 B1 * | 9/2007 | Chung | | 361/679.33 |
| 7,405,928 B2 * | 7/2008 | Robertson et al. | | 361/679.33 |
| 7,414,838 B2 * | 8/2008 | Yeh | | 361/688 |
| 7,489,505 B2 * | 2/2009 | Hong et al. | | 361/679.35 |
| 7,525,796 B2 * | 4/2009 | Chih et al. | | 361/679.33 |
| D600,966 S * | 9/2009 | Weng et al. | | D6/632 |
| 7,710,719 B2 * | 5/2010 | Hong et al. | | 361/679.35 |
| 2006/0152899 A1 * | 7/2006 | Wang | | 361/685 |
| 2009/0009953 A1 * | 1/2009 | Lin | | 361/685 |
| 2010/0238623 A1 * | 9/2010 | Pan | | 361/679.33 |

FOREIGN PATENT DOCUMENTS

JP 3139123 U * 1/2008

* cited by examiner

*Primary Examiner* — Lisa Lea Edmonds
(74) *Attorney, Agent, or Firm* — Rabin & Berdo, P.C.

(57) ABSTRACT

A disk array structure includes a housing, a connection seat, and at least two disks. The housing contains at least two transversal holding spaces, and the connection seat is assembled with the housing, containing a circuit board, at least two connectors, and a rear sheath casing. Each connector is electrically connected at an inner side of the circuit board, and the rear sheath casing is assembled at an outer side of the circuit board, containing plural connection holes and a toggle switch. Each disk is loosely installed in each holding space of the housing, with one end electrically connected with each connector of the connection seat, and the other end having a handle. The structure is carried conveniently, the disks are extracted conveniently, heat is dissipated quickly, the structure is manufactured quickly, manufacturing cost is reduced, and the structure serves as a mouse pad and is toggled for use conveniently.

10 Claims, 4 Drawing Sheets

DISK ARRAY STRUCTURE

BACKGROUND OF THE INVENTION a) Field of the Invention

The present invention relates to a disk array structure, and more particularly to a disk array structure which, by an assembly design of a housing, a connection seat, and at least two disks, is easy to carry, convenient to extract the disks, cooled down quickly, manufactured quickly, provided with lower manufacturing cost, able to serve as a mouse pad, and convenient to swap for use, thereby being applied to all kinds of disk arrays or the like.

b) Description of the Prior Art

Since availability of a PC (Personal Computer), a hard disk has been a storage device that is used most often. However, in terms of speed, the hard disk is one of the weakest equipment in the PC, comparing with a CPU (Central Processing Unit) and a RAM (Random Access Memory). In order to accelerate entire data streaming of the computer, and to increase a throughput capacity of storage, thereby improving security of data in a hard disk, a design of a disk array arises. The disk array is called a RAID (Redundant Array of Inexpensive Disks) in short, and its working principle is to use make a disk set in an array fashion, for improving the data security, in association with a design of distributed arrangement of the data. The disk array is an improvement method primarily developed to solve the problem that the hard disk is not able to match the CPU and the memory in terms of the capacity and the speed. The disk array includes a large-scale disk set assembled by a lot of inexpensive disks having smaller capacity, higher stability, and slower speed, using an additive effect from provision of data by the individual disk, to improve an efficiency of the entire disk system. In a mean time, while saving the data, the data are divided into a lot of blocks which are stored respectively on each disk, by using this technology. In addition, a concept of parity check can be also used by the disk array, such that when any one hard disk in the array malfunctions, data can be still accessed, and the data in the faulty hard disk can be computed and then be re-placed into a new hard disk, upon re-constructing the data.

The disk array exists in a system to emulate a logical disk by using more than two hard disks. A disk array controller is used to realize the existence of the disk array and to emulate all kinds of levels by using different types of arrays. The levels of the RAID which are addressed and applied most frequently are 0, 1, 0+1, 3, and 5. Other levels that are rarely used include RAID 4 and RAID 6. RAID 0 proposes a concept of using the disk array to store data in parallel, using a plurality of hard disks to parallel store different parts of a data. A general approach is to divide the data to be stored by a block of a specified length, with a first block being stored in a first hard disk of the array, a second block being stored in a second hard disk, and so forth. The length unit of the block can be a sector, a cluster, a track, or even an entire cylinder. On the other hand, RAID 1 proposes a concept of disk mirror to secure the data. An original proposal uses two disk drives with a same capacity to store a same data. By adding another hard disk to store the same data, a risk of data loss by failure of one of the disks can be reduced. In Windows NT (New Technology), a user is permitted to use a disk partition of the same capacity to build up the disk mirror, without being limited to using a size of the entire hard disk, so as to improve flexibility in using disks of different capacities. For example, the user can purchase a hard disk with a larger capacity, and use some partition of the hard disk to serve as a mirror of some hard disk, with the other partition being used for other purpose. Similar to RAID 0, RAID 2 also uses the disk array to store data in parallel. However, other than RAID 0, RAID 2 distributes data to each disk drive by bytes, not the large block of RAID 0. In other words, in RAID 2, a first byte of the data is stored in a first disk of the array, a second byte is stored in a second disk of the array, and so forth, thereby similarly improving the efficiency of data accessing. Comparing to RAID 0, as RAID 2 uses the byte as a unit of distribution, each read or write operation will induce all disk drives in the array to read or write simultaneously. RAID 2 also uses a plurality of extra disk drives to store an error correction code (ECC) or a parity check code, to increase a fault tolerance of the data. Adding every one such disk drive represents that a number of faulty disk drives that are tolerable for the disk array will also be increased by one. The purpose of the error correction code is that when some disk drive malfunctions, correct data can be still recovered from the data of other non-faulty disk drives, through computation. The degree of data recovering will depend upon a proportion of the number of error correction disk drives in the total number of disk drives.

It is known that the conventional disk array structure includes primarily a housing, a circuit control board and a plurality of disks. An interior of the housing is provided with a plurality of disks which are stacked longitudinally, and each disk is connected to a connector on the circuit control board, thereby forming the disk array. However, for the disk array structure, as the interior of the housing is disposed with the plurality of longitudinally stacked disks, an entire volume will be larger that it is inconvenient to carry. Furthermore, if each disk is to be swapped, as there is no related handling member, it will be inconvenient to swap the disk. Therefore, the conventional disk array structure cannot still fit with the user's need in practical application.

SUMMARY OF THE INVENTION

The primary object of the present invention is to provide a disk array structure, which is an assembly design of a housing, a connection seat, and at least two disks, with an interior of the housing being formed with two holding spaces that are arranged transversally, such that at least two disks can be inserted with each connector at a front end of the connection seat at the other end of the housing, through the holding spaces in the housing; and by a handle at the other end of each disk, the disk can be extracted conveniently, thereby facilitating carrying and extracting, and largely improving practicability and convenience of the entire structure.

Another object of the present invention is to provide a disk array structure which can be cooled down quickly due to that the housing is made by an aluminum material, thereby increasing the practicability of the entire structure.

Still another object of the present invention is to provide a disk array structure which can be manufactured quickly and conveniently to reduce manufacturing cost and to increase the practicability and the convenience of the entire structure, due to that the housing is made from an aluminum-extrusion manufacturing process.

Yet another object of the present invention is to provide a disk array structure, wherein due to that the housing is a thin-type design, a surface of the housing can serve as a mouse pad, thereby increasing the practicability of the entire structure.

Still yet another object of the present invention is to provide a disk array structure, wherein a toggle switch which is disposed on a rear sheath casing can be used to toggle between using as the disk array and using as two disks, and a plurality of connection holes which are disposed on the rear sheath casing are used for insertion of a USB (Universal Serial Bus) plug, a power plug, etc., thereby facilitating application, and increasing the practicability of the entire structure.

Accordingly, the present invention is a disk array structure which includes a housing, a connection seat, and at least two disks. An interior of the housing is formed with at least two holding spaces that are arranged transversally. The connection seat is assembled with the housing, and is provided with a circuit board, at least two connectors, and a rear sheath casing, with each connector being electrically connected at an inner side of the circuit board, the rear sheath casing being assembled at an outer side of the circuit board, and being provided with a plurality of connection holes and a toggle switch that are electrically connected with the circuit board. Each disk is loosely installed in each holding space of the housing correspondingly, and an end of each disk is electrically connected with each connector of the connection seat correspondingly; whereas, the other end of each disk is provided with a handle. Accordingly, the disk array structure can be carried conveniently, the disks can be extracted conveniently, the disk array structure can be cooled down quickly and manufactured quickly, the manufacturing cost can be reduced, the disk array structure can be used as the mouse pad and can be easily toggled for use, thereby increasing the practicability and the convenience of the entire structure.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
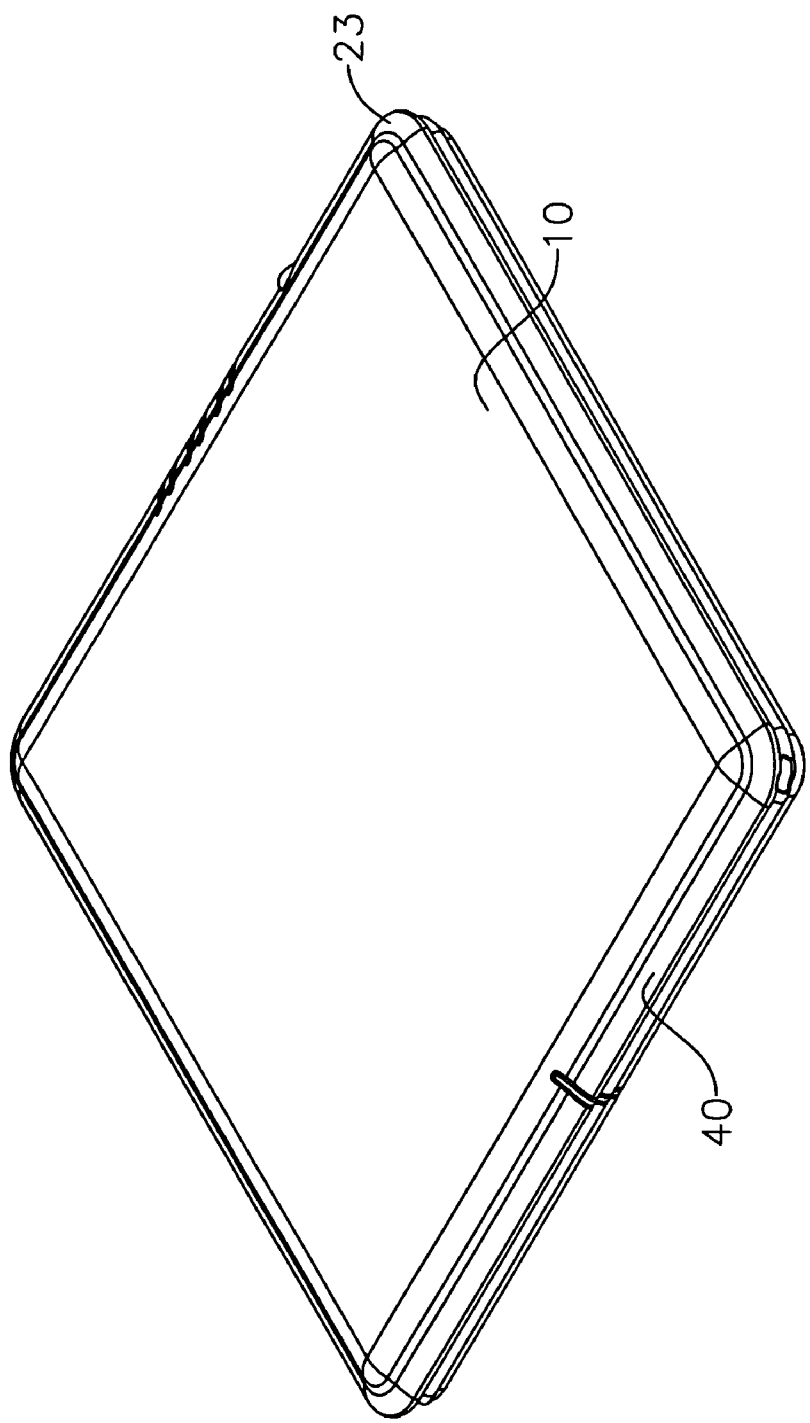
FIG. 1 shows a perspective view of an embodiment of the present invention.
Figure 2:
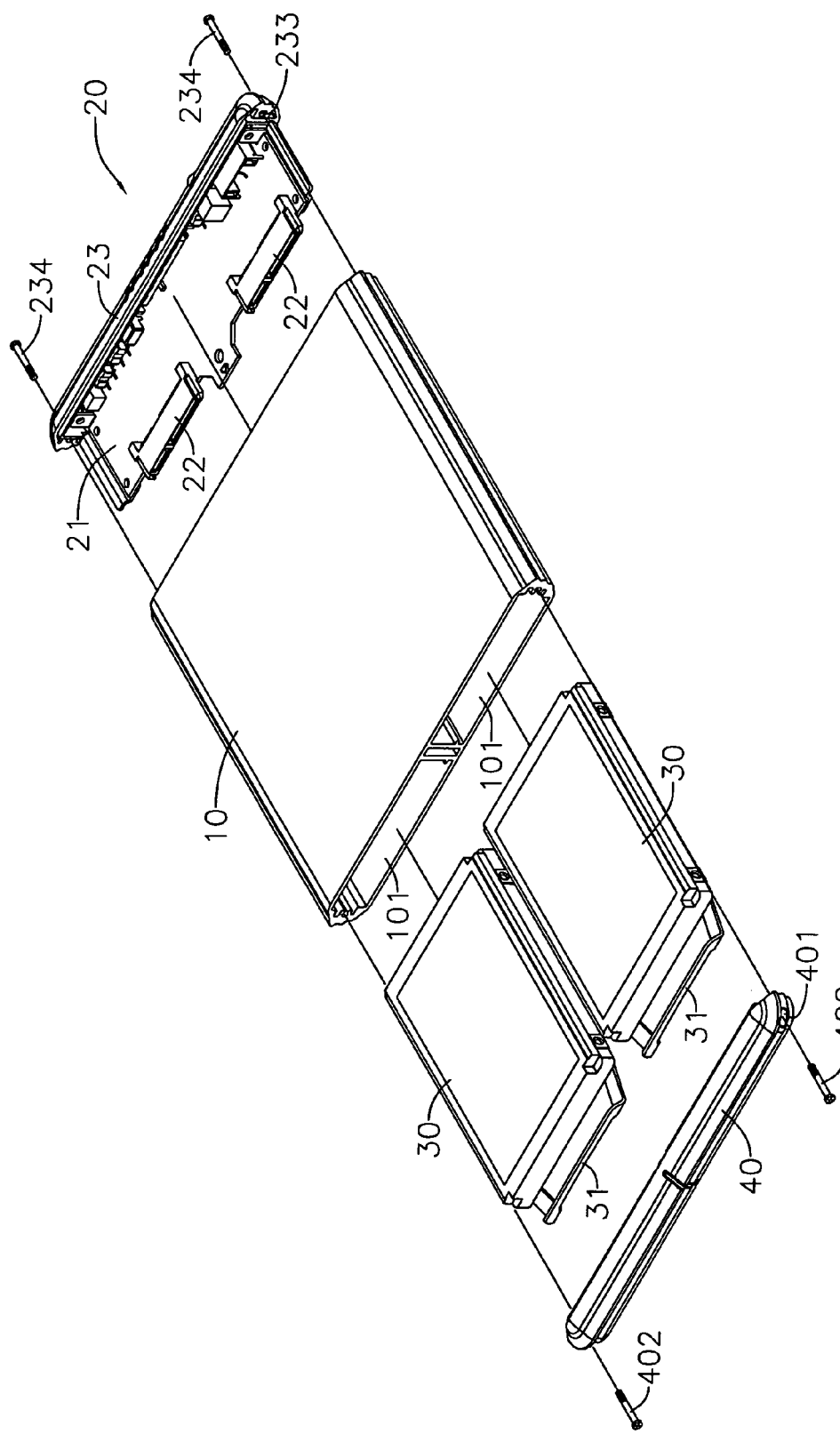
FIG. 2 shows an exploded view of elements of an embodiment of the present invention.
Figure 3:
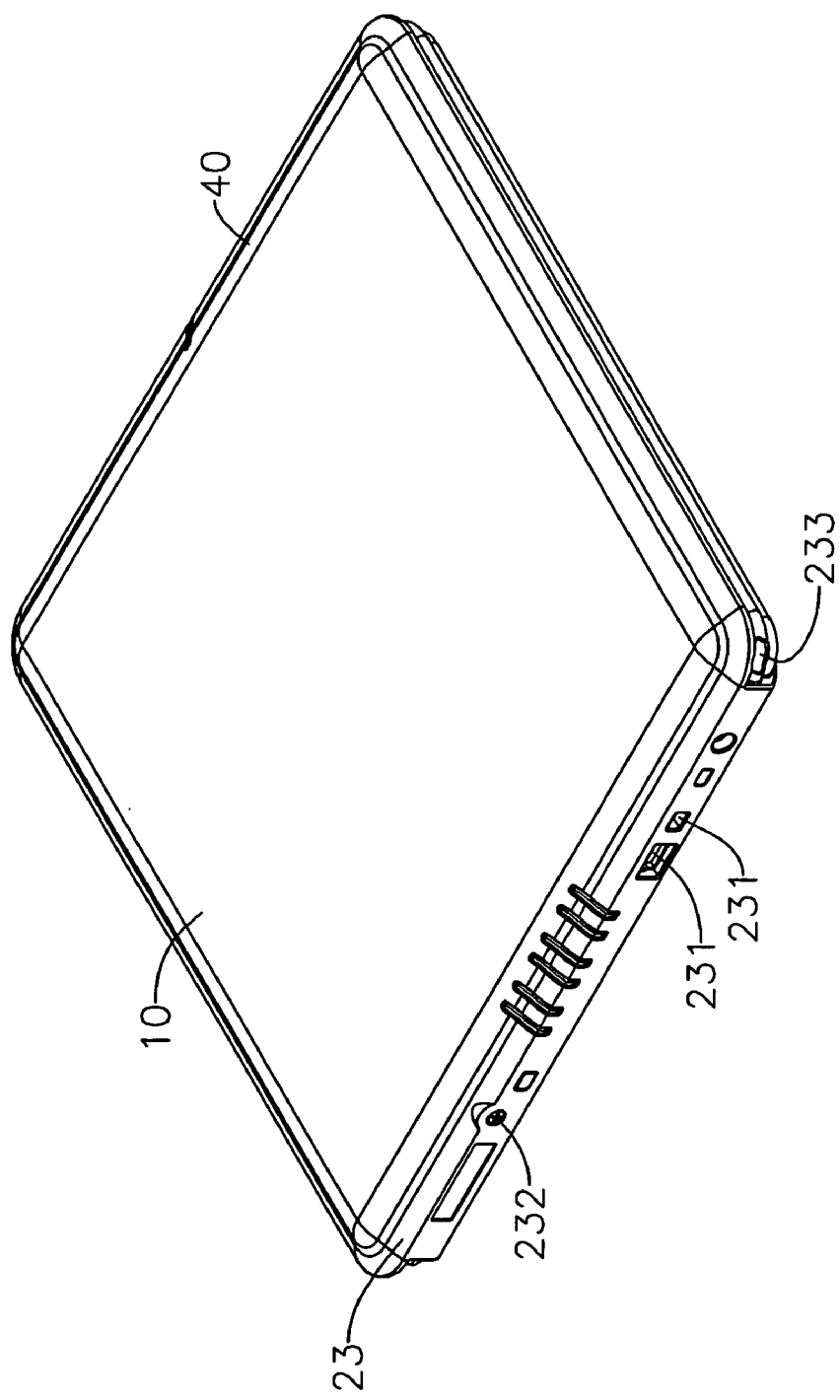
FIG. 3 shows a perspective view at another view angle of an embodiment of the present invention.
Figure 4:
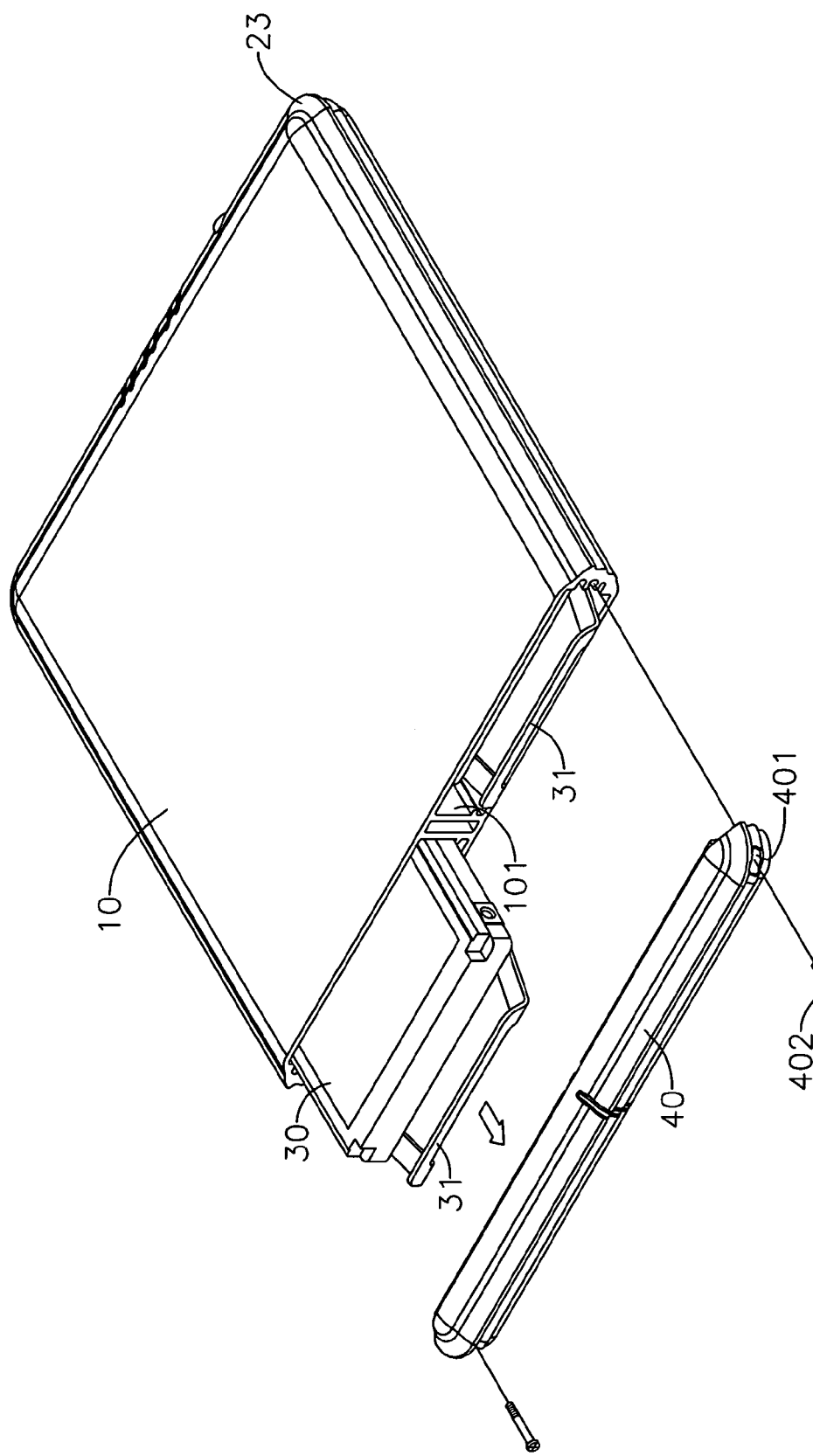
FIG. 4 shows a schematic view of an embodiment of the present invention that a disk is being extracted.

Referring to FIGS. 1 to 4, the present invention is a disk array structure which comprises a housing 10, an interior of which is formed with at least two holding spaces 101 that are arranged transversally, with the housing 10 being made by an aluminum material for dissipating heat, and being made from an aluminum-extrusion manufacturing process; a connection seat 20, which is assembled with the housing 10, and is provided with a circuit board 21, at least two connectors 22, and a rear sheath casing 23, with each connector 22 being electrically connected at an inner side of the circuit board 21, the rear sheath casing 23 being assembled at an outer side of the circuit board 21, and being provided with a plurality of connection holes 231 (a USB plug hole, a power plug hole, etc.) and a toggle switch 232 that are electrically connected with the circuit board 21, two sides of the rear sheath casing 23 of the connection seat 20 being provided with screw holes 233 that provide for two screw members 234 to lock the rear sheath casing 23 of the connection seat 20 with the housing 10; at least two disks 30, each of which is loosely installed in each holding space 101 of the housing 10 correspondingly, an end of each of which is electrically connected with each connector 22 of the connection seat 20 correspondingly, and the other end of each of which is provided with a handle 31 for facilitating extracting.

A front end of the housing 10 is further assembled with a front sheath casing 40 to seal each disk 30 into the housing 10, and two ends of the front sheath casing 40 are provided with screw holes 401 that allow two screw members 402 to lock the front sheath casing 40 with the housing 10.

Accordingly, as shown in FIGS. 1 to 4, the present invention is an assembly design of the housing 10, the connection seat 20, and at least two disks 30, wherein the housing 10 is a thin-type design, and its interior is formed with at least two holding spaces 101 that are arranged transversally, such that at least two disks 30 can be inserted with each connector 22 at the front end of the connection seat 20 that is assembled at the other end of the housing 10, through the two holding spaces 101. On the other hand, by providing the handle 31 at the other end of each disk 30, the disk 30 can be extracted conveniently, thereby facilitating carrying and extracting. On the other hand, as the housing 10 is made by the aluminum material, heat can be dissipated quickly. Furthermore, as the housing 10 is made from an aluminum-extrusion manufacturing process, it can be manufactured quickly, thereby reducing manufacturing cost. In addition, as the housing 10 is a thin-type design, its surface can serve as a mouse pad. Moreover, the toggle switch 232 disposed on the rear sheath casing 23 can be used to toggle between using as the disk array and using as two disks 30, and the plurality of connection holes 231 on the rear sheath casing 23 can provide for insertion of a USB plug, a power plug, etc., for facilitating application. Accordingly, the present invention is provided with the effects that the structure can be carried conveniently, the disks can be extracted conveniently, heat can be dissipated quickly, the structure can be manufactured quickly, the manufacturing cost can be reduced, the structure can serve as the mouse pad, and the application can be toggled conveniently, thereby increasing the practicability and the convenience of the entire structure.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A disk array structure comprising:
   a housing, an interior of which is formed with at least two holding spaces that are arranged transversally;
   a connection seat, which is assembled with the housing, and is provided with a circuit board, at least two connectors, and a rear sheath casing, with each connector being electrically connected at an inner side of the circuit board, the rear sheath casing being assembled at an outer side of the circuit board and being provided with a plurality of connection holes and a toggle switch that are electrically connected with the circuit board; and
   at least two disks, each of which is loosely installed in each holding space of the housing correspondingly, an end of each of which is electrically connected with each connector of the connection seat correspondingly, and the other end of each of which is provided with a handle for facilitating extraction.

2. The disk array structure according to claim 1, wherein two sides of the rear sheath casing of the connection seat are provided with screw holes, allowing two screw members to lock the rear sheath casing of the connection seat with the housing.

3. The disk array structure according to claim 1, wherein the housing is made by an aluminum material for dissipating heat.

4. The disk array structure according to claim 1, wherein a front end of the housing is further assembled with a front sheath casing, for sealing each disk into the housing.

5. The disk array structure according to claim 4, wherein two sides of the front sheath casing are provided with screw holes, allowing two screw members to lock the front sheath casing with the housing.

6. The disk array structure according to claim 1, wherein the housing is made from an aluminum-extrusion manufacturing process.

7. The disk array structure according to claim 2, wherein the housing is made from an aluminum-extrusion manufacturing process.

8. The disk array structure according to claim 3, wherein the housing is made from an aluminum-extrusion manufacturing process.

9. The disk array structure according to claim 4, wherein the housing is made from an aluminum-extrusion manufacturing process.

10. The disk array structure according to claim 5, wherein the housing is made from an aluminum-extrusion manufacturing process.

* * * * *